W. J. LYNCH.
SIDE FRAME CROSS CONNECTION.
APPLICATION FILED JUNE 13, 1914.
1,140,049.
Patented May 18, 1915.
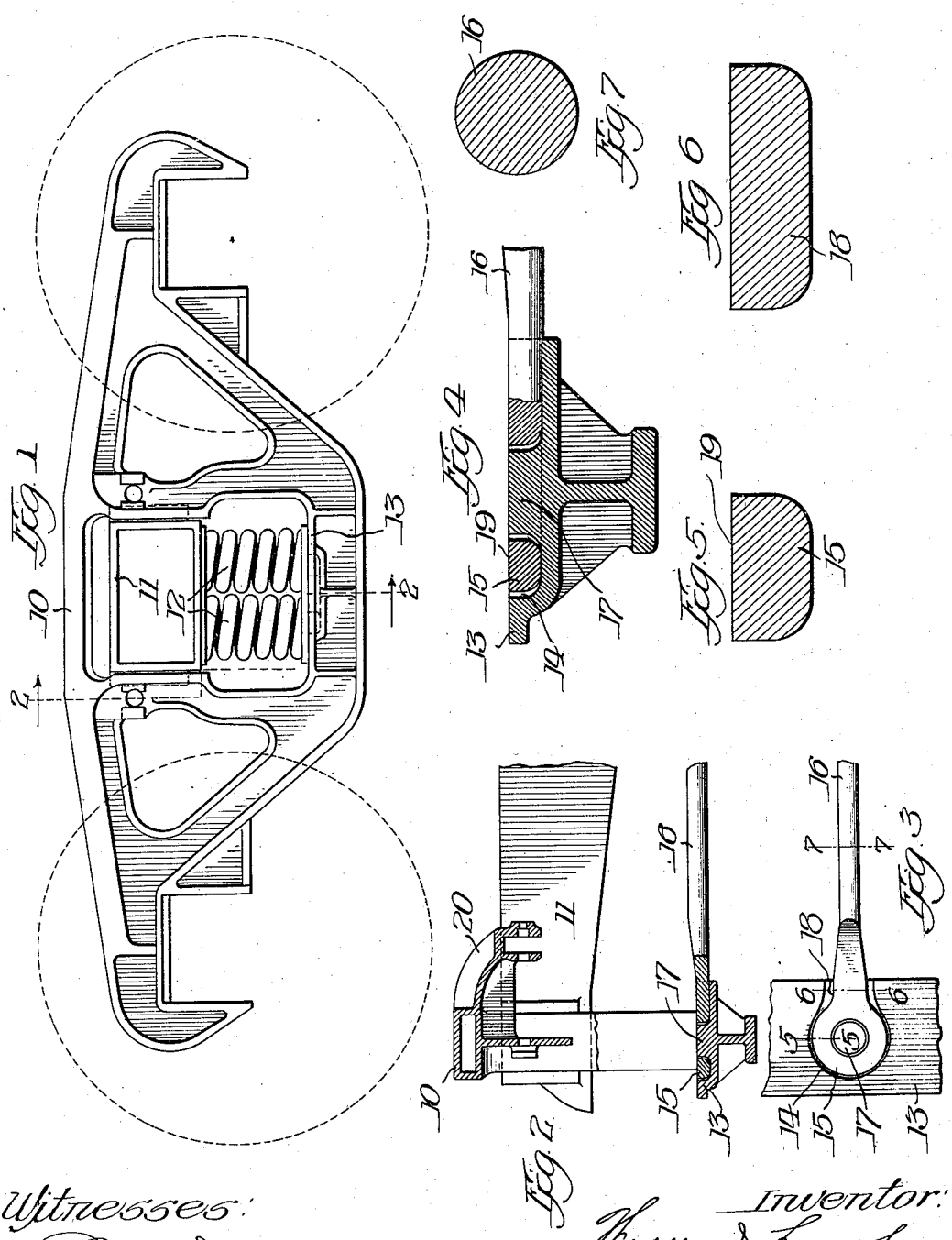

UNITED STATES PATENT OFFICE.

WARREN J. LYNCH, OF NEW YORK, N. Y., ASSIGNOR TO AMERICAN STEEL FOUNDRIES, OF NEW YORK, N. Y., A CORPORATION OF NEW JERSEY.

SIDE-FRAME CROSS CONNECTION.

1,140,049.      Specification of Letters Patent.      Patented May 18, 1915.

Application filed June 13, 1914. Serial No. 844,874.

*To all whom it may concern:*

Be it known that I, WARREN J. LYNCH, a citizen of the United States, residing at New York city, in the county of New York and State of New York, have invented new and useful Improvements in Side-Frame Cross Connections, of which the following is a specification.

My invention relates to car trucks and has particular reference to a novel connection between the side frames of a car truck.

It is well understood that a connection must be provided between adjacent side frames forming a part of a car truck, this connection formerly being called a spring plank or sand plank. Usually, also, this connecting member has been in the form of a channel or wide plate; or in the form of two angles spaced apart a distance corresponding to substantially the width of the bolster. This connecting member was usually riveted or bolted securely to the side frames and produced a so-called square truck; that is, a truck without such flexibility as would permit of self adjustment thereof to inequalities in the track surface. It has been found, however, that a flexible truck is desirable, and to this end the connecting element corresponding to the spring plank has been connected to the side frames in such manner as to allow for a limited universal movement.

I have, however, devised a cross connecting member having the functions of the spring plank which provides for flexibility and which has an added function in that the truck may be constructed with a shorter wheel base. This is accomplished by constructing the connecting member in the form of a rod whereby but little transverse space is occupied thereby. The brake beams and brake hangers may therefore be hung at a point closer to the bolster and the wheels of the truck brought closer together. This, as stated, provides for the shorter wheel base and a lighter truck. A truck with a short wheel base has improved hauling qualities and reduces the friction between the wheels and the track.

The invention may be more readily understood by reference to the accompanying drawings wherein:

Figure 1 is a side elevation of a car truck constructed in accordance with my invention. Fig. 2 is a section of the line 2—2 of Fig. 1. Fig. 3 is the fragmentary plan view of a portion of the side frame sill with the connecting rod seated therein. Fig. 4 is an enlarged sectional view of the sill and connecting rod. Figs. 5, 6 and 7 are sections taken on the lines 5—5, 6—6, 7—7 respectively of Fig. 3.

Referring more particularly to the drawings, it will be seen the invention is applied to a car truck having side frames 10, each thereof provided with an intermediate opening within which a bolster 11 is seated, the bolster resting on springs 12. The sill 13 of the side frame provides a seat for the springs. The sill 13 is as shown in Figs. 2 and 4, recessed as at 14, to accommodate the eye 15 of the cross-connecting member 16. A central upperly projecting lug 17 integral with the sill 13 enters the circular opening in the rod and provides for a rigid connection between the frames. However, sufficient clearance is provided between the engaging parts to permit the required flexibility. As shown in Figs. 3 and 4 the clearance both around the eye 15 and at the shank 18 is sufficient to permit limited movement. The upper portion 19 of the eye is flattened to bring the surface into parallelism with the top of the seat 13; the lower portion being slightly rounded as shown in Fig. 5. The shank is of similar construction, the bar assuming its round shape as shown in Fig. 7 throughout the remainder of its length. As will be seen the connecting bar is held in the position shown by the weight of the bolster exerted through springs 12.

The brake hanger lugs 20 may, by reason of the use of the bar here described, be placed close to the bolster 11, for the reason that the brake beam and brake heads will not interfere with the spring plank. Thus the truck may be constructed with a shorter wheel base than has heretofore been possible, particularly in a loose or generally flexible truck. The advantage as here claimed could not be secured to the full extent in a truck having a rod or plate rigidly connecting the two side frames. If such construction were attempted the rod or plate being of slight cross section would become broken at a point close to the side frames, the connecting member not providing sufficient strength to resist the tendency to flexibility in the truck.

It is obvious that modifications may be made in the construction shown, and such modifications as are in the scope of my claims I consider within the spirit of my invention.

I claim:

1. In a car truck the combination of side frames each thereof having a recessed spring seat a boss located centrally within said recess, and a round rod provided with eyes in its ends connecting said side frames, said eyes being seated in the recesses in said spring seats and engaging said boss substantially as described.

2. In a car truck, the combination of side frames, each thereof having a spring seat provided with a recess therein, said recess being rounded at its bottom and providing a central boss, and an eye-bar connecting-rod for said frames, the eyes of said bar being rounded on one side and flat on another side and being adapted to being seated in the recesses provided therefor in said frames, substantially as described.

WARREN J. LYNCH.

Witnesses:
R. F. DARBY,
T. R. SADLER.